Inventors
Toshio Asaeda,
Tamaki Tomita &
Ikuo Suzuki
By Hutchinson & Milans Attorneys United States Patent Office 3,588,992
Patented June 29, 1971

3,588,992
MANUFACTURING PROCESS FOR A METAL BONDED POROUS SUBSTANCE, PARTICULARLY A TOOL MADE OF SAID SUBSTANCE
Toshio Asaeda, Tokyo, Tamaki Tomita, Kariya, and Ikuo Suzuki, Aichi Prefecture, Japan, assignors to Toyoda Koki Kabushiki Kaisha, Kariya, Aichi Prefecture, Japan
Filed June 12, 1968, Ser. No. 736,485
Claims priority, application Japan, June 16, 1967, 42/38,569
Int. Cl. B22f; B23p 17/00
U.S. Cl. 29—420                 17 Claims

ABSTRACT OF THE DISCLOSURE

A manufacturing process for a metal bonded porous substance, and of a tool made of it, said substance being obtained by pretreatment of the surface of the particles for a subsequent metal coating step, press-forming the resulting particles to specified size and shape, dipping the press-formed mass of particles thus obtained into a solvent containing a metal salt, and then forcibly passing said solvent through said press-formed mass of particles, thereby precipitating the metal on the surfaces of these particles to bind said particles together.

BACKGROUND OF THE INVENTION

According to the conventional methods of manufacturing a metal bonded grinding stone, particularly a metal bonded diamond grinding stone, diamond particles are blended with powders of such metals as copper, copper alloy, nickel, iron, silver, etc., and after being press-formed, the blended mass is sintered in a sintering furnace, thereby producing a grinding stone by the so-called sintering method. In another method diamond particles are placed on a metal plate and adhered to this plate with metals deposited by electro-plating (mainly nickel-plating) thereby producing a grinding stone by the so-called electro-plating method.

The sintering method, however, has the disadvantage that on account of the grinding stone having to be heated to the temperature at which the bonding metal can be sintered, the diamond particles themselves are liable to be oxidized and the grinding stone is liable to shrink after the sintering thereof.

In the case of the electro-plating method, it may be relatively easy to produce a metal bonded one layer grinding stone which represents a grinding stone with particles deposited in a single layer on its surface, but it would be extremely complicated and difficult to produce a metal bonded multi-layer grinding stone which represents a grinding stone with particles deposited in a multi-layer on its surface.

Furthermore, the conventional metal bonded grinding stones manufactured by the above-mentioned methods lack the pores necessary for effective removal of the chips produced by the grinding operation and accordingly are lacking in means for preventing the loading of the pores which will result in deterioration of the precision finish of the surface, or cause a thermal crack on the work surface. Moreover, said conventional metal bonded grinding stones are exceedingly difficult to dress. For these reasons practically no grinding stones uses Alundum, Carborundum, other than diamond, as abrasive particles, have been manufactured.

SUMMARY OF THE INVENTION

The present invention relates to the manufacturing process of a metal bonded porous substance which is free from the above-mentioned disadvantages and particularly of a tool made of said substance.

The primary object of the present invention is to heat a metal bond substance to low temperature instead of to the sintering temperature of the bond metal, thereby avoiding the oxidation of diamond particles and preventing the metal bond substance from shrinking after the sintering of bond metal powder mass.

Another object of this invention is to adjust the pores formed among the particles to a desired size by controlling the pressure in a press-forming step or the coating duration of the metal in the metal bonding step, thereby facilitating the disposal of grinding chips, preventing the loading of the pores and the deterioration of the precision finish of the surface and preventing the formation of a thermal crack on the work surface.

Still other objects of this invention are to provide a grinding tool which has sufficient mechanical strength despite the pores existing therein, superior electric and thermal conductivity and which is suitable not only for common grinding but also for electrolytic grinding.

Other and further objects and advantages of the present invention will become apparent from the following description and the appended claims, reference being had to the accompanying drawings forming a part of this specification. The invention may be embodied in the forms illustrated in the drawings, attention being called to the fact, however, that the drawings are illustrative only, and that changes may be made in the specific constructions illustrated and described, so long as the scope of the appended claims is not violated.

BRIEF DESCRIPTION OF THE DRAWINGS

In the accompanying drawings which form a part of this application.

Like characters of reference are used throughout the following specification and the accompanying drawings to designate corresponding parts.

DESCRIPTION OF THE PREFERRED EMBODIMENTS

Figure 2:
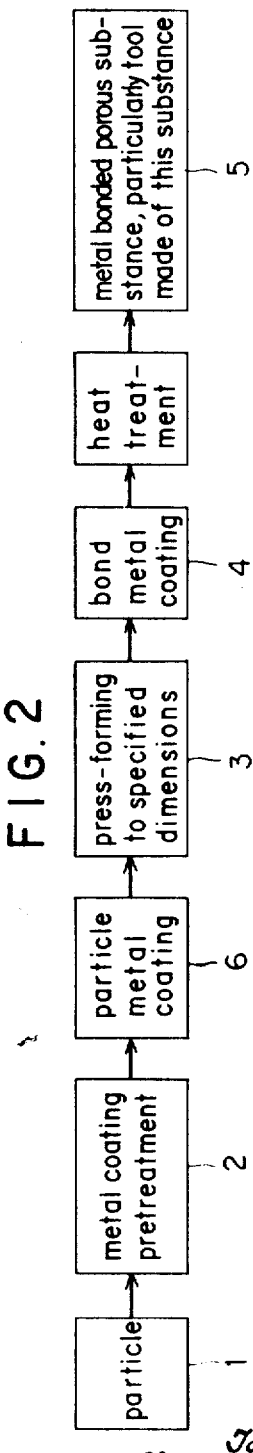
FIG. 2 shows a block diagram illustrating another embodiment of this invention.
Figure 3:
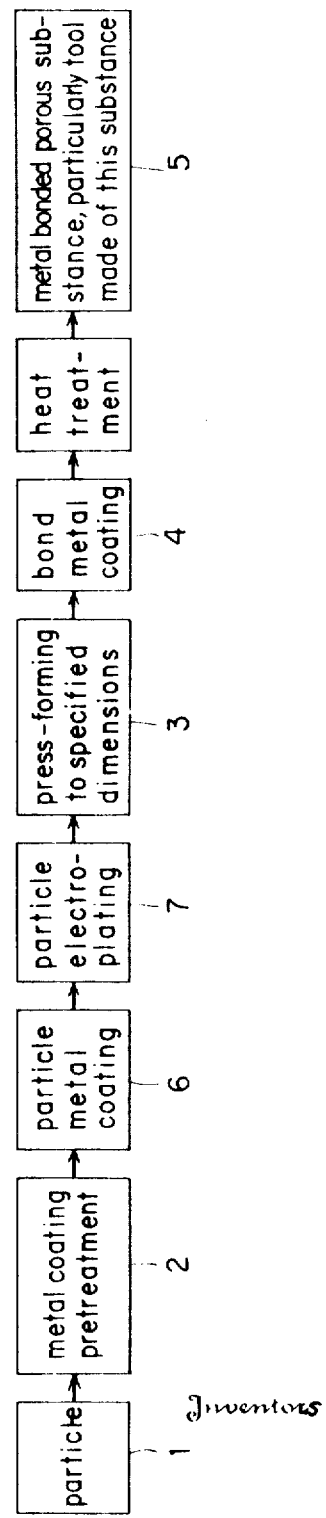
FIG. 3 shows a block diagram illustrating still another embodiment of this invention.

Referring to the drawings, there are disclosed in FIGS. 1, 2 and 3 block diagrams of three embodiments of the present invention each of which will now be described.

(A) FIRST EMBODIMENT—METHOD OF FIG. 1

Figure 1:
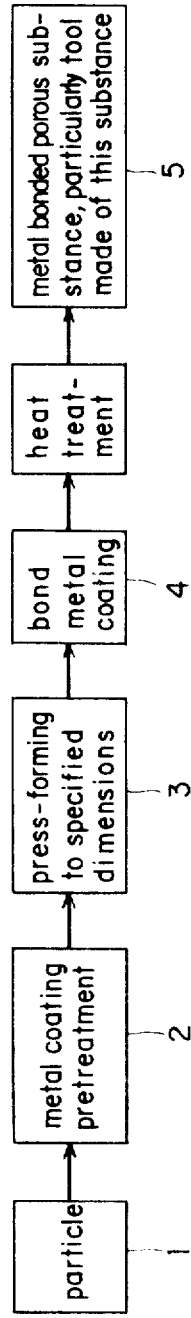
FIG. 1 shows a block diagram illustrating an embodiment of the present invention.

(a) Referring to FIG. 1 the block diagram sets forth the steps taken in the first embodiment of our inventive process. The particles 1, particularly abrasive particles, comprise such substances as diamond, Alundum, white Alundum, Carborundum, green Carborundum, and similar substances. If necessary or desired, graphite, glass, etc.

may be added. Of course, it would be possible to employ particles, which are a mixture with appropriate proportions of diamond, Alundum, Carborundum, etc.

The first step in this process is identified as 2 and consists of a pretreatment for the metal coating in which the particles 1 are treated in preparation of the subsequent bond metal coating. In this metal coating pretreatment step, the particles 1 are generally acid and alkali-washed to remove grease and impurities from their surfaces. They are than subjected to a sensitivity treatment in preparation for depositing catalyzer metal molecules uniformly on said surfaces and then said surfaces are activated to have catalyzer metal molecules uniformly deposited thereon. Depending upon the circumstances, the pretreatment for metal coating may be acid-washing and alkali-washing alone.

In this embodiment as an appropriate example of this step 2, the particles 1 are 50 g. of 60 mesh white Alundum and are pretreated for metal coating as follows:
(1) Acid-washing, alkali-washing
  (i) Boiling for 10 minutes in 500 cc. of HCl.
  (ii) Washing with distilled water.
  (iii) Boiling for 10 minutes in 500 cc. of 5% aqueous solution of NaOH.
  (iv) Washing with distilled water.
(2) Sensitivity treatment
  (i) Immersing in 300 cc. of an aqueous solution of $SnCl_2$ prepared by mixing at a ratio of $SnCl_2$ 10 g., HCl 40 cc. and $H_2O$ 1000 cc.; and agitating for five minutes at room temperature.
  (ii) Washing lightly with distilled water.
(3) Activating treatment
  (i) Immersing in 300 cc. of aqueous solution of $PdCl_2$ prepared by mixing at a ratio of $PdCl_2$ 1 g., HCl 10 cc. and $H_2O$ 4000 cc.; and agitating for 5 minutes at room temperature.
  (ii) Washing lightly with distilled water.

Figure 4:
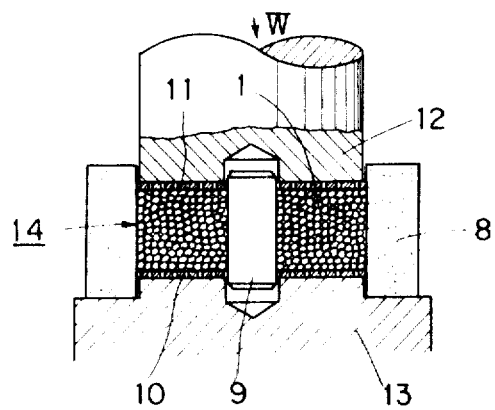
FIG. 4 shows a vertical section of the press-forming device for abrasive particles in this invention.

(b) The particles 1 having been pretreated for metal coating in step 2 are formed to specified dimensions in the forming stage 3 of FIG. 1. In FIG. 4 showing a schematic view of the press-forming device, the particles 1 having been pretreated for metal coating are packed into the mold frame 8 made of a synthetic resin with a synthetic resin shaft 9 in the core. The top and bottom of said particles mass are covered with synthetic resin nets 10, 11 of a finer mesh than the particle size. Thereafter, said particles mass as assembled is placed between the top mold 12 and the bottom mold 13 and press-formed to specified dimensions under the forming pressure W, thereby producing a press-formed mass 14. By regulating the forming pressure W, the volume of space between the particles 1 can be made large or small, thereby adjusting the percentages of abrasive particle ratio and pore. Preferably, in this example the forming pressure is 0.25 ton/cm.$^2$ and the pressing duration is of 5 minutes.

The mold frame 8 and holding nets 10, 11 are made of synthetic resin, because this material is not attacked by the plating liquid.

(c) The above-mentioned press-formed mass 14 of specified dimensions is next in the bond metal coating stage 4 coated with a bond metal to bind the particles mutually together with metal thus preventing separation of the particles and increasing the mechanical strength of the press-formed mass. For this bond metal coating process of bonding particles mutually with metal, a chemical plating method is employed. A metal salt-containing solvent (chemical plating liquid), is forcibly passed through the spaces between said press-formed particles, thereby making the metal of said metal salt precipitate on the surface of particles by utilization of reducing reaction and thermal decomposition reaction.

Figure 5:
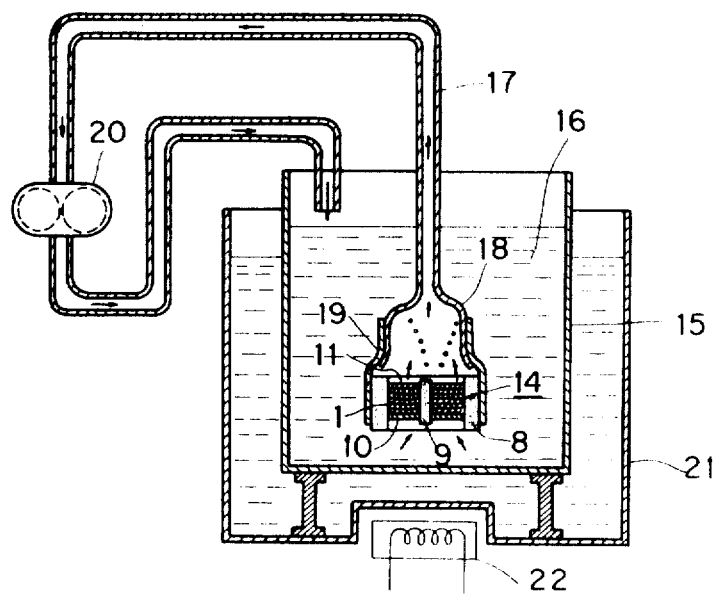
FIG. 5 shows a schematic view in vertical section of the chemical plating device for bonding the press-formed mass in this invention.

In the present embodiment as shown in the drawings, the chemical plating method has been employed. FIG. 5 shows a schematic view of the bonding chemical plating device, with the press-formed mass 14 immersed in the bonding chemical plating liquid 16 contained in a vessel 15. The mold frame 8 for said press-formed mass 14 and the opening 18 of the suction tube 17 are connected through a rubber membrane 19 with each other so that said bonding chemical plating liquid 16 may be forcibly passed through the spaces between particles 1 of said press-formed mass, a pump 20 being inserted at a midpoint of said suction tube 17. When this pump 20 is operated, said bonding chemical plating liquid 16 passes through the holding net 10 and forcibly through the spaces between the particles 1 of said press-formed mass 14 and out through the holding net 11 into the suction tube 17 and returns to the vessel 15, as shown.

In FIG. 5, 21 is a tank for warming said bonding chemical plating liquid 16 and 22 is a heater therefor.

The following are preferably employed as the bonding chemical plating liquid 16:

Nickel chemical plating liquid;
Copper chemical plating liquid;
Cobalt chemical plating liquid;
Nickel-cobalt chemical plating liquid; or
Silver chemical plating liquid.

An example of the composition of nickel chemical plating liquid is given as follows:

|  | G./l. |
|---|---|
| $NiCl_2.6H_2O$ | 30 |
| $NaH_2PO_2.H_2O$ | 10 |
| $CH_3COONa.3H_2O$ | 50 | and HCl is added to adjust the pH to 4.5–5.5 value.

Figure 8A:
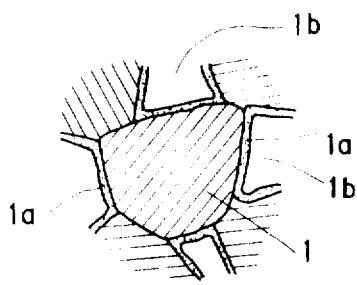
FIGS. 8A, B and C show enlarged details of the structures of grinding stone manufactured in accordance with the process of this invention.
Figure 8B:
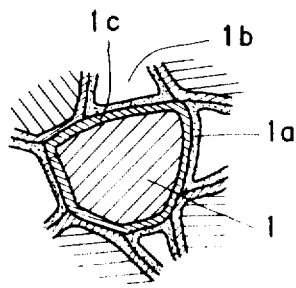
Figure 8C:
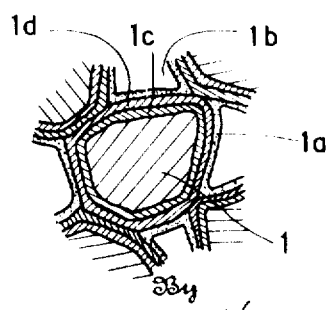

As this liquid 16 flows through the spaces between the surface of each particle 1 as illustrated in FIG. 8–A and this metal layer 1a binds the particles into a solid mass.

By controlling the duration of time and the liquid temperature for bond metal coating the thickness of said metal layer 1a can be arbitrarily set and accordingly the percentage of bond material and pore, and the mechanical strength can be adjusted.

In the present example of this embodiment, when said press-formed mass 14 was chemically plated using 2 l. of nickel chemical plating liquid with the above-mentioned composition at a temperature of 90–95° C., the plating time being 1 hour and the suction of said liquid circulated by the pump 20 being 0.4 l./min. which resulted in 2 g. of bond metal (nickel) precipitation.

(d) Following the bond metal coating of said press-formed mass 14, the mold frame 8, the shaft 9 and the holding nets 10 and 11 are removed, and then heat treatment is made within the temperature range of 300° C. to 500° C., preferably about 400° C., for more than 30 minutes, preferably for 60 minutes, in vacuum or in an atmosphere of inert gas. Said heat treatment is made for the purpose of crystallizing said precipitated metal, because the precipitated metal deposited by the nickel chemical plating method is a non-crystalline metal. Thus we increase the mechanical strength of the press-formed mass 14 and moreover, in the case of a grinding stone, we improve and simplify the dressing operation of the grinding stone.

Figure 7:
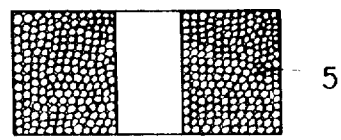
FIG. 7 shows a cross-section of a grinding stone manufactured in accordance with the process of this invention.

Thus, the manufacturing process of the metal bonded porous substance, or a tool made of it, is finished and the grinding stone 5 as shown in FIG. 7 is produced. FIG. 8–A shows the structure of this grinding stone 5 in which 1 designates the particles, 1a the bond metal coated layers and 1b the pores.

(B) SECOND EMBODIMENT—METHOD OF FIG. 2

(a) In the same way as in the preceding embodiment, the particles 1 are first submitted to a metal coating pretreatment step 2, i.e., preparation of the particle surface for the subsequent metal coating step.

Figure 6:
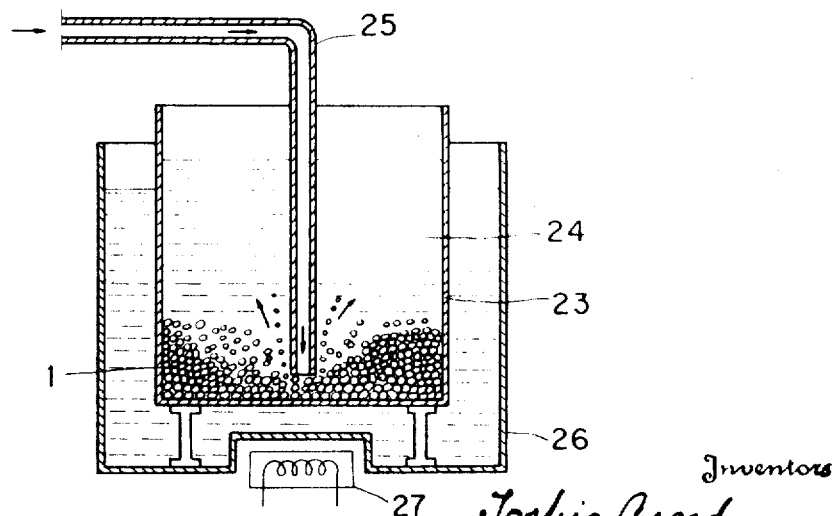
FIG. 6 shows a schematic view in vertical section of the chemical plating device for abrasive particles in this invention.

(b) The particles 1 pretreated in step 2 are in the metal coating stage 6 coated with a metal layer. The particles 1 prepared in Step 2 are in the metal coating stage 6 coated with a metal layer for improving the thermal conductivity of the particles and for preventing the lowering of the mechanical strength of the particles due to thermal influence. For the purpose of metal coating, chemical plating, electroplating and others, all of which are methods of metal deposition on the surface of a non-electric-conductive particle, are available. In the disclosure of this embodiment, the chemical plating method is employed. FIG. 6 shows a schematic view of the chemical plating device, the particles 1 having been pretreated for metal coating are immersed in the chemical plating liquid 24 contained in a vessel 23. Air under pressure is emitted through an air tube 25 into said chemical liquid to agitate the particles 1 so that their surfaces may be evenly coated with metal. Thus, as shown in FIG. 8–B, the surface of each particle 1 is coated with a uniform metal layer 1c. In FIG. 6, 26 is a tank for warming the chemical plating liquid 24 and 27 is a heater. As the chemical plating liquid, the following are preferably used:

Nickel chemical plating liquid;
Copper chemical plating liquid;
Cobalt chemical plating liquid; or
Nickel-cobalt chemical plating liquid.

To illustrate this present step 6 of this embodiment, when 5 g. of 60 mesh white Alundum pretreated for metal coating was chemically plated using 1 l. of a nickel chemical liquid 24 of the same composition as in the first embodiment, with said liquid heated to 90–95° C. and the plating time 1 hour, the result was 2 g. of bond metal (nickel) precipitation.

(c) In absolutely the same way as in the first embodiment the particles 1 now having been coated with a metal layer 1c in the above-mentioned stage 6 are press-formed to specified dimensions in the forming stage 3.

(d) In absolutely the same way as in the first embodiment, the press-formed mass 14 of specified dimensions is in the metal coating stage 4 coated with a bond metal, thereby binding all particles into a solid mass with the metal.

(e) Following the bond metal coating of said press-formed mass 14, the mold frame 8, the shaft 9 and the holding nets 10 and 11 are removed, and heat treatment is made within the temperature range of 300° C. to 500° C., preferably about 400° C., for more than 30 minutes, preferably for 60 minutes, in vacuum or in an atmosphere of inert gas. Thereupon the manufacturing process of the metal bonded porous substance, particularly of a tool made of it is finished, producing a grinding stone 5 as shown in FIG. 7. The structure of this grinding stone is shown in FIG. 8–B, in which 1 is the particle, 1a the bond metal coating layer, 1b the pores and 1c the metal coat of the particles.

In this second embodiment, in which the particles 1 are already coated with a metal layer 1c in the metal coating stage 6, the metal bonding of particles in the bond metal coating stage 4 is better, and accordingly the electric conductivity is better, than in the first embodiment.

(C) THIRD EMBODIMENT—METHOD OF FIG. 3

(a) In absolutely the same way as in the first embodiment, the particles 1 are submitted to metal coating pretreatment step 2, i.e., preparation of the particle surface for the subsequent metal coating.

(b) In absolutely the same way as in the second embodiment, the particles 1 pretreated for metal coating are in the metal coating stage 6 coated with a metal layer 1c.

(c) The particles 1 coated with a metal layer 1c in the above-mentioned stage 6 are in the electro-plating stage 7 electro-plated to increase the thickness of the metal coat layer, thus further improving the thermal conductivity of the particles and as the result the metal coat 1c of the particle 1 is, as illustrated in FIG. 8–C, overlaid with an electro-plated layer 1d. For the purpose of this electroplating, usually the following processes are available:

Copper electroplating;
Nickel electroplating;
Silver electroplating; or
Chrome electroplating.

An example of the composition of copper electroplating liquid is as follows:

| | G./l' |
|---|---|
| CuCN | 45 |
| NaCN | 90 |
| KOH | 15 |
| COOKCH(OH)CH(OH)COONa.4H$_2$O | 50 |

To illustrate this step 7 of the present embodiment, 60 g. of nickel-coated 60 mesh white Alundum (70% white Alundum and 30% nickel) was copper-electroplated by means of a well-known barrel type electro-plating apparatus, using 2 l. of copper electro-plating liquid of the above-mentioned composition, with the current 3A, the liquid temperature 40° C., the barrel revolution 2 r.p.m. and the plating time 8 hours. The result was 20 g. of copper plating.

(d) In absolutely the same way as in the first embodiment, the particles 1 coated with an electro-plated layer 1d in the above-mentioned stage 7 are press-formed in the forming stage 3 to specified dimensions.

(e) In absolutely the same way as in the first embodiment, the press-formed mass 14 is in the bond metal coating stage 4 coated with a bond metal, thereby binding the particles into a solid mass.

(f) Following the bond metal coating of said press-formed mass 14, the mold frame 8, the shaft 9 and the holding nets 10 and 11 are removed, and heat treatment is made within the temperature range of 300° C. to 500° C., preferably about 400° C., for more than 30 minutes, preferably for 60 minutes, in vacuum or in an atmospere of inert gas, thereby completing the manufacture of the metal bonded porous substance, or particularly a tool made of it and as the result producing the grinding stone 5 of FIG. 7. The structure of this grinding stone is shown in FIG. 8–C, in which 1 is the particle, 1a the bond metal coat layer, 1b the pores, 1c the metal coat of the particles and 1d the electroplated layers.

In this third embodiment in which the surface of the metal coat layer 1c is in the electro-plating stage 7 further overlaid with an electro-plated layer 1d, the thickness of the metal coat of the particle 1 can be increased and accordingly better electric conductivity than in the second embodiment can be assured.

As described in the above, the present invention provides a manufacturing process of a metal bonded porous substance, particularly of a tool made of this substance, said process comprising the step of binding particles of diamond, Alundum, Carborundum with a metal bond which is deposited by a bond metal coating method using a metal salt-containing solvent. According to this invention, the bond metal is precipitated in the spaces between particles by reducing reaction and thermal decomposition reaction using a metal salt-containing solvent; and by means of this bond metal, the particles are bound together. Therefore, in this invented process unlike the conventional manufacturing process by sintering, there is no need for heating the grinding stone itself up to the sintering temperature for the bond metal, because the metal bonding takes place at a lower temperature than in the sintering process. For this reason, the diamond particles of the grinding stone obtained by the new process are not likely to be oxidized and the grinding stone itself is not likely to shrink in dimensions. Meanwhile, in the present invention, pores are necessarily formed among particles, because a metal salt-containing solvent is in the bond metal coating stage 4 forcibly passed through the spaces between the particles, thereby binding the particles into a solid mass.

The size of the pores can be arbitrarily set or controlled through the regulation of the forming pressure in the forming stage 3 or through the regulation of the bond metal coating time and temperature in the bond metal coating stage 4.

Accordingly, in the grinding stone of this invention, the disposal of grinding chips is effectively obtained and unlike in the conventional metal bonded grinding stone, this new metal bonded grinding stone is relatively free from loading of the pores and free from the possibility of damaging the precision finish of the work surface or causing a thermal crack on the work surface.

Furthermore, the grinding stone of this invention, on account of the particle surface being uniformly coated with a metal layer and all particles being bound together with this metal layer, is mechanically strong enough in spite of its porous structure. Furthermore, its superior electric and thermal conductivity makes this grinding stone suitable for electrolytic grinding as well as conventional grinding. Moreover, since the metal coat can be uniformly thin, this new grinding stone can be dressed without any difficulty.

The metal bond tool manufactured in the above cited embodiments can be heat-treated to make the metal bond harder, and brittle, thereby enhancing the tool performance. In the nickel metal bond tool obtained in one of these embodiments, the precipitated nickel represents a non-crystalline nickel containing about 8% phosphorus and much hydrogen; namely it exists in an unstable phase, which is liable to cause a cracking or flaking of precipitated nickel, thereby weakening the bond. If such metal bond tool is heated to within the temperature range of 300° C. to 500° C., preferably about 400° C., and held at this temperature for more than 30 minutes, preferably for 60 minutes in vacuum or in an atmosphere of inert gas, the following results are obtained:

(1) The hydrogen which causes a cracking or flaking of precipitated nickel can be completely expelled;

(2) The non-crystalline nickel can be perfectly crystallized producing a fine, close structure; and (3) Nickel and phosphorous can be combined forming a compound with high hardness, i.e. $Ni_3P$, which is uniformly and finely distributed in the nickel matrix.

Thus, the nickel can be transformed into a stable phase, while the hardness of nickel precipitation can be remarkably increased to about $H_v$ 1000 (Vicker's hardness) after this heat treatment against above $H_v$ 500 as precipitated. In other words, while the above-mentioned heat treatment increases the bonding power of the precipitated nickel, the brittleness of the precipitated nickel is also increased. Therefore, the grinding stone thus obtained, in spite of being a metal bonded grinding stone, has a metal bond of very high hardness and high brittleness. Accordingly, just like the vitrified grinding stone, the metal bond is fractured and the abrasive particles can be easily separated during dressing with a conventional simple point-dresser. Namely, the grinding stone manufactured according to the present invention though it is a metal bond grinding stone, can be as easily dressed as a vitrified one.

It goes without saying that the present invention is not confined in application to the manufacture of grinding stones, but may be extended to the manufacture of any metal bonded porous substance other than the grinding stone.

We claim:

1. A manufacturing process for a metal bonded porous substance, particularly of a tool made of said substance, said process comprising the following steps:

(a) a preliminary pretreating step in which abrasive particles, such as diamond, Alundum, Carborundum, and the like, have their surfaces cleaned and prepared for subsequent metal coating;

(b) a press-forming step in which the abrasive particles pretreated in (a) are press-formed to specified structural dimensions; followed by (c) a bond metal coating step in which the press-formed abrasive particles obtained in (b) are placed in a metal salt-containing solvent and said solvent is forcibly passed through the spaces between said press-formed abrasive particles, thereby making the non-crystalline metal precipitate on the surfaces of said press-formed abrasive particles and binding these abrasive particles with the precipitated metal; and (d) finally a heat treatment step at a temperature significantly below the sintering temperature of the bond metal in which the non-crystalline bond metal coated on the press-formed abrasive particles in (c) is crystallized.

2. A manufacturing process for a metal bonded porous substance, particularly of a tool made of said substance as claimed in claim 1, wherein said bond metal coating in (c) is applied by a chemical plating method.

3. A manufacturing process for a metal bonded porous substance, particularly of a tool made of said substance as claimed in claim 2, wherein said chemical plating method comprises a nickel chemical plating method.

4. A manufacturing process for a metal bonded porous substance, particularly of a tool made of said substance as claimed in claim 1, wherein said heat treatment is made within the temperature range of 300° C. to 500° C.

5. A manufacturing process for a metal bonded porous substance, particularly of a tool made of said substance, said process comprising the following steps:

(a) a preliminary pretreating step in which the abrasive particles, such as diamond, Alundum, Carborundum, and the like, have their surfaces cleaned and prepared for subsequent metal coating;

(b) a particle metal coating step in which the abrasive particle surfaces pretreated in (a) are coated with a precipitated metal layer to improve the thermal conductivity of said abrasive particles;

(c) a press-forming step in which the abrasive particles coated with metal in (b) are press-formed to specified structural dimensions; followed by (d) a bond metal coating step in which the abrasive particles press-formed in (c) are placed in a metal salt-containing solvent and said solvent is forcibly passed through the spaces between said press-formed abrasive particles, thereby making the non-crystalline metal precipitate on the surfaces of said press-formed particles and binding these abrasive particles with the precipitated metal; and finally a (e) heat treatment step at a temperature significantly below the sintering temperature of the bond metal in which the non-crystalline bond metal coated on the press-formed abrasive particles in (d) is crystallized.

6. A manufacturing process for a metal bonded porous substance, particularly of a tool made of said substance as claimed in claim 5, wherein said particle metal coating in (b) is applied by a chemical plating method.

7. A manufacturing process for a metal bonded porous substance, particularly of a tool made of said substance as claimed in claim 6, wherein said chemical plating method comprises a nickel chemical plating method.

8. A manufacturing process for a metal bonded porous substance, particularly of a tool made of said substance as claimed in claim 5, wherein said bond metal coating in (d) is applied by chemical plating method.

9. A manufacturing process for a metal bonded porous substance, particularly of a tool made of said substance as claimed in claim 8, wherein said chemical plating method comprises a nickel chemical plating method.

10. A manufacturing process for a metal bonded porous substance, particularly of a tool made of said substance as claimed in claim 5, wherein said heat treatment is made within the temperature range of 300° C to 500° C.

11. A manufacturing process for a metal bonded porous substance, particularly of a tool made of said substance, said process comprising the following steps:

(a) a preliminary pretreating step in which the abrasive particles, such as diamond, Alundum, Carborundum, and the like, have their surfaces cleaned and prepared for subsequent metal coating;

(b) a particle metal coating step in which the abrasive particle surfaces pretreated in (a) are coated with a precipitated metal layer to improve the thermal conductivity of said abrasive particles;

(c) an electro-plating step in which the abrasive particle surfaces coated with metal in (b) are electro-plated to increase the thickness of metal coat for further improving the thermal conductivity of said abrasive particles;

(d) a press-forming step in which the abrasive particles with the metal coat increased in thickness in (c) are press-formed to specified structural dimensions;

(e) a bond metal coating step in which the press-formed abrasive particles obtained in (d) are placed in a metal salt-containing solvent and said solvent is forcibly passed through the spaces between said press-formed abrasive particles, thereby making the non-crystalline metal precipitate on the surfaces of said press-formed abrasive particles and binding these abrasive particles with the precipitated metal; and finally (f) a heat treatment step at a temperature significantly below the sintering-temperature of the bond metal in which the non-crystalline metal coated on the press-formed abrasive particles in (d) is crystallized.

12. A manufacturing process for a metal bonded porous substance, particularly of a tool made of said substance, as claimed in claim 11, wherein said particle metal coating in (b) is applied by a chemical plating method.

13. A manufacturing process for a metal bonded porous substance, particularly of a tool made of said substance, as claimed in claim 12, wherein said chemical plating method comprises a nickel chemical plating method.

14. A manufacturing process for a metal bonded porous substance, particularly of a tool made of said substance, as claimed in claim 11, wherein said electro-plating method is copper electro-plating method.

15. A manufacturing process for a metal bonded porous substance, particularly of a tool made of said substance, as claimed in claim 11, wherein said bond metal coating in (e) is applied by a chemical plating method.

16. A manufacturing process for a metal bonded porous substance, particularly of a tool made of said substance, as claimed in claim 15, wherein said chemical plating method comprises a nickel chemical plating method.

17. A manufacturing process for a metal bonded porous substance, particularly of a tool made of said substance as claimed in claim 11, wherein said heat treatment is made within the temperature range of 300° C. to 500° C.

References Cited
UNITED STATES PATENTS

| | | |
|---|---|---|
| 2,273,589 | 2/1942 | Olt. |
| 2,409,295 | 10/1946 | Marvin et al. |
| 2,370,242 | 2/1945 | Hensel et al. |
| 3,049,799 | 8/1162 | Breining et al. _____ 21—420 |
| 3,153,279 | 10/1964 | Chessin _____ 29—420 |

JOHN F. CAMPBELL Primary Examiner

D. C. REILEY, Assistant Examiner

U.S. Cl. X.R.

29—527.4